US005590686A

United States Patent [19]

Prendergast

[11] Patent Number: 5,590,686
[45] Date of Patent: Jan. 7, 1997

[54] LIQUID DELIVERY SYSTEMS

[75] Inventor: Frank T. Prendergast, Woodridge, Ill.

[73] Assignee: Dober Chemical Corp., Midlothian, Ill.

[21] Appl. No.: 433,933

[22] Filed: May 2, 1995

[51] Int. Cl.[6] .................................................. G05D 7/06
[52] U.S. Cl. ........................................ 137/597; 137/607
[58] Field of Search ...................... 137/101.19, 101.21, 137/597, 607

[56] References Cited

U.S. PATENT DOCUMENTS

| | | |
|---|---|---|
| 3,311,130 | 3/1967 | Caldwell ............................ 137/597 X |
| 3,437,098 | 4/1969 | Stark et al. ............................ 137/607 |
| 4,196,748 | 4/1980 | Gillespie ............................ 137/597 X |
| 4,627,457 | 12/1986 | Bird et al. ............................ 137/597 X |
| 4,632,147 | 12/1986 | Whaley ............................ 137/597 X |
| 5,123,443 | 6/1992 | Garrison ............................ 137/597 |
| 5,246,026 | 10/1993 | Proudman . |
| 5,310,430 | 5/1994 | McCall, Jr. . |
| 5,320,118 | 6/1994 | Fernholz . |
| 5,344,074 | 10/1994 | Spriggs et al. . |
| 5,385,044 | 1/1995 | Thomas et al. . |
| 5,389,344 | 2/1995 | Copeland et al. . |

Primary Examiner—Stephen M. Hepperle
Attorney, Agent, or Firm—Frank J. Uxa

[57] ABSTRACT

Liquid delivery systems, for example, for use in providing liquid chemicals to a plurality of individual laundry wash machines, are disclosed. The present systems employ a single flow meter to effectively measure the amount of liquid chemical to be delivered. The present systems, in addition, provide for effective liquid chemical leak detection, and positive proof that the liquid chemical has been delivered to the individual wash machine. A control assembly is preferably included which automatically controls the operation of the system.

17 Claims, 1 Drawing Sheet

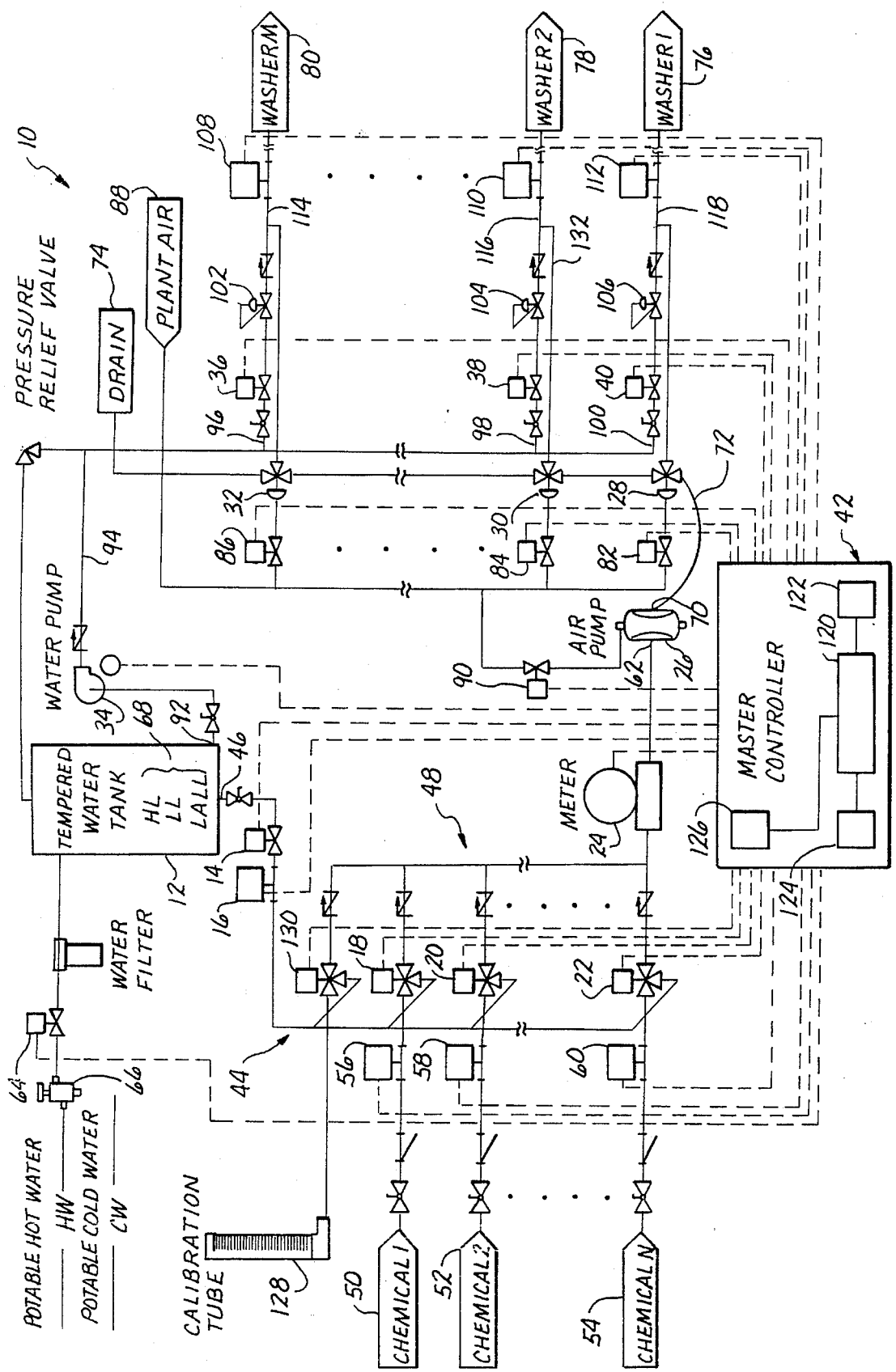

LIQUID DELIVERY SYSTEMS

BACKGROUND OF THE INVENTION

The present invention relates to new liquid delivery systems. More particularly, the invention relates to liquid delivery systems in which two or more liquid chemicals are to be delivered to two or more processing units, for example, laundry wash machines.

In the laundry industry, various liquid chemicals, such as detergents, bleaches, alkalis, acids and the like, are employed, often during different parts of the same wash cycle. The proper or desired amount of each of these liquid chemicals must be delivered at the correct time and in the correct sequence in the wash cycle. Quite often, the individual liquid chemicals are incompatible with one another, e.g., mixing of two or more of these materials can cause a violent and/or damaging reaction. In such circumstances, it is important that the liquid chemicals not be allowed to mix during delivery.

Because the laundry industry involves or uses large volumes of liquid chemicals, it is important that the delivery system functions without wasting these materials. Thus, it would be advantageous to provide a delivery system which can detect and warn of liquid chemical leaks.

In addition, the delivery system should be mechanically straightforward, reliable and provide reproducible delivery results.

Proudman U.S. Pat. No. 5,246,026 discloses a liquid delivery system which employs two flowmeters and compares the flows monitored by these two flowmeters in determining how much liquid chemical is delivered. This Proudman system has several disadvantages. In the first place, comparing the results obtained from two flowmeters requires that both meters be accurate in order that the comparison is correct. Continual flowmeter calibrations are required to provide such accuracy. Also, the Proudman system has no means for detecting liquid chemical leaks. Thus, the Proudman system is relatively expensive to install, operate and maintain, provides results which may not be accurate and can involve relatively large and expensive losses of liquid chemicals.

SUMMARY OF THE INVENTION

New systems for delivery of liquids, for example, liquid chemicals in laundry or other wash applications, have been discovered. The present systems provide for automatic (without human intervention) control of liquid chemical delivery so that little or no risk of human error is involved. The present systems are mechanically straightforward, easy to operate and provide reliable and reproducible results with low maintenance requirements. Results from a single flow meter, preferably a magnetic flowmeter, are the primary bases for delivering the desired amount of liquid chemical. Thus, the control scheme is less complex and less subject to error, for example, relative to a two flow meter delivery system. The single flowmeter used preferably requires only very infrequent recalibration, if at all. In addition, the present systems preferably have a positive, and more preferably automatic, leak detection system which results in enhanced operational safety and reduced operational costs. In short, the present liquid delivery systems provide substantial benefits and advantages not embodied in or suggested by the prior art.

In one broad aspect of the present invention, liquid delivery systems are provided which comprise:
  a pump including a liquid inlet and a liquid outlet;
  a plurality of valves each of which is located with respect to one of a plurality of containers adapted to hold liquid chemical, each of the valves is adapted to control the flow of liquid chemical out of one of the containers;
  a diluent valve located with respect to a diluent reservoir including a diluent outlet to control the flow of diluent out of the diluent reservoir through the diluent outlet;
  a first liquid conduit assembly adapted to provide fluid communication between the diluent valve and each of the plurality of valves;
  a second liquid conduit assembly adapted to provide fluid communication between each of the plurality of valves and the pump;
  a total flow meter located and adapted to measure the volume flow of liquid being passed from the second liquid conduit assembly into the pump through the liquid inlet; and
  a control assembly adapted to control the pump, the plurality of valves and the diluent valve, and for monitoring the volume flow of liquid measured by the flow meter. The control assembly is adapted, for example, pre-programmed, to close said diluent valve prior to opening any of the plurality of valves to allow liquid chemical to pass into the second liquid conduit assembly and to open one of the plurality of valves to allow liquid chemical from one of the containers to pass into the second liquid conduit assembly, and to thereafter close the one of the plurality of valves to prevent liquid chemical from one of the containers from passing into the second liquid conduit assembly. The control assembly, preferably comprising an electronic computer, acts to close one of the valves to prevent liquid chemical from passing from one of the containers into the second liquid conduit assembly based on the volume flow of liquid measured by the total flow meter during the time the one valve is open to allow liquid chemical to pass into the second liquid conduit assembly.

Preferably, the control assembly is further adapted to open the diluent valve after the valve which had been open is closed to prevent liquid chemical from passing out of the container into the second liquid conduit assembly. In addition, the control assembly is preferably adapted to open the diluent valve to allow diluent to pass into the second liquid conduit assembly for a time, more preferably for a predetermined period of time, prior to opening any of the valves to allow liquid chemical to pass into the second liquid conduit assembly.

The use of a post flush of diluent (after the liquid chemical has passed into the second liquid conduit assembly) removes substantially all of the liquid chemical from the second liquid conduit assembly. This, in turn, effectively separates the liquid chemicals, which may be mutually incompatible, and allows each of the chemicals to be delivered using the same system.

Unless otherwise expressly stated, each of the components of the present systems may be any suitable such component provided that it functions as described herein and has no substantial adverse effect on the operability and/or effectiveness of the system. For example, any suitable pump, for example, commercially available pump, may be employed to pump liquid from the second liquid conduit assembly. However, it is preferred to use a pump driven by air, or an air pump, to perform this pumping function since such air pumps are easily controlled, are safe and can be driven by plant air which is readily available at most industrial facilities.

The present liquid delivery systems preferably include a flow indicator assembly adapted to monitor liquid flow, in particular diluent flow, in the first liquid conduit assembly, for example, diluent from the diluent reservoir. This flow indicator assembly may be a flow meter or the like device. However, it is preferred that this diluent flow indicator assembly be a single flow switch because this assembly monitors only the presence or absence of flow, not the amount of flow. This feature is a clear distinction from the system disclosed in Proudman U.S. Pat. No. 5,246,026 which requires two flow meters, with one flowmeter monitoring the water (diluent) flow rate.

In a particularly useful embodiment, the present systems further comprise a plurality of liquid chemical flow indicator assemblies each of which is located and adapted to monitor liquid flow between one of the liquid chemical containers and one of the valves. Although any suitable flow indicator assemblies, e.g., flow meters, may be employed, simple flow switches are preferred. These liquid chemical flow indicator assemblies are monitored by the control assembly so that the control assembly monitors any time that flow occurs. Of course, if liquid chemical is being passed through a valve into the second liquid conduit assembly, the flow indicator assembly will sense this flow. This is or can be considered "normal" flow. However, if no such normal flow is present, a positive flow signal from any of these flow indicator assemblies indicates a liquid chemical leak. In this event, if such a leak is detected or sensed, the control assembly provides an alarm, for example, an audial or visual alarm, so that the operator is warned of this condition and can take steps to correct the leak. This in an important feature of the present invention and allows the detection of liquid chemical leaks very effectively and inexpensively.

Any suitable type of flowmeter, for example, such as those commercially available, may be employed in the present systems as the total flowmeter. However, a particularly useful total flowmeter is a magnetic flowmeter, such as that sold by Johnson/Yokagawa under the tradename ADMAG. Such a magnetic flowmeter provides a number of substantial advantages in the present systems. For example, because such magnetic flowmeters have few, if any, moving parts, the need for recalibration is reduced, or even eliminated. This reduced recalibration requirement provides time-savings and process efficiency advantages. In addition, such magnetic flow meters are substantially insensitive to differing or varying viscosities. Many of the liquid chemicals delivered by the present systems have significantly differing viscosities. Ordinary flowmeters, for example, turbine flowmeters, require recalibration and/or compensation for variable viscosities. However, the presently preferred magnetic flowmeters accurately monitor liquids having widely varying viscosities without the need for recalibration or viscosity compensations. Thus, the presently preferred magnetic flowmeters further reduce the complexity of the present systems while providing accurate and effective liquid chemical delivery.

In another broad aspect of the invention, liquid delivery systems for delivering liquid chemical to a plurality of processing units are provided. These systems comprise:

a liquid pump including a liquid inlet and a liquid outlet and adapted to pump liquid chemical through the liquid outlet;

a plurality of diverter valves, each diverter valve located with respect to an individual processing unit to control the flow of liquid chemical from the liquid outlet toward the individual processing unit;

a diluent pump including a pump inlet and a pump outlet and adapted to pump diluent out of a diluent reservoir and through the pump outlet;

a plurality of line valves, each line valve located with respect to an individual processing unit to control the flow of liquid from the pump outlet into the individual processing unit; and a control assembly adapted to control the diluent pump, the plurality of diverter valves and the plurality of line valves.

Preferably, the control assembly is adapted to activate one of the diverter valves to allow liquid from the liquid outlet to flow toward an individual processing unit, to deactivate one of the diverter valves to prevent liquid from the liquid outlet from flowing toward the individual processing unit, and thereafter to open one of the line valves to allow liquid from the pump outlet and liquid from the liquid outlet downstream of one of the diverter valves to flow into an individual processing unit. In effect, the present systems provide that the pump which carries the liquid chemical provides that liquid chemical to a point in the system where it can be more effectively carried or pumped by the diluent pump. The use of these two pumps allows the liquid chemical pump to service the need for liquid chemical of a different one of the individual processing units at the same time the liquid chemical is being furnished to the first individual processing unit.

A plurality of combined flow indicator assemblies are preferably provided. Each of these combined flow indicator assemblies is located and adapted to monitor liquid flow toward a different processing unit. Although flowmeters may be employed, flow switches are particularly useful as the combined flow indicator assemblies. The control assembly monitors the flow in each of the combined flow indicator assemblies. The presence and absence of flow monitored by each of the combined flow indicator assemblies is a positive indication that the liquid chemical has been provided to the individual processing unit. This "proof of delivery" feature of the present invention is straightforward and substantially fail-safe so that the use of the present liquid delivery systems is very effective in delivering liquid chemical to each of the processing systems.

Each of the plurality of diverter valves preferably includes an air driven actuator which is controlled by the control assembly. In one very useful embodiment, plant air, such as that which is conventionally available at industrial sites, is used in actuating the plurality of diverter valves and driving the air pump discussed elsewhere herein.

Although any suitable type of control assembly may be employed to control the present system, particularly useful are control assemblies which comprise electronic computers. A particularly useful control assembly comprises a programmable logic controller (PLC) sold by Allen Bradley under the tradename SLC 500. The control assembly may include a keyboard, for example, to input control information into the control assembly, a monitor or other visual display component, for example, to visually display the control information and/or any operating information being monitored by the control system from the remaining components of the system, and/or to identify alarm situations. In addition, the control assembly may include a audial alarm component to sound an alarm signal in the event the system identifies an alarm situation.

The use of the present systems including diverter valves and diluent pumps may be employed independently of the present systems including first and second liquid conduit assemblies. However, it is preferred that both of these systems be used together to provide optimum benefits. Such combined systems are within the scope of the present invention.

In addition, methods for delivering liquid chemicals are included within the scope of the present invention. These methods are directed to using the present liquid delivery systems, for example, for delivering a plurality of liquid chemicals to a plurality of individual processing units, such as individual laundry wash machines, other wash machines and the like.

These and other aspects of the present invention will become apparent in the following detailed description and claims, particularly when considered in conjunction with the accompanying drawing in which like parts bear like reference numbers.

BRIEF DESCRIPTION OF THE DRAWING

The drawing is a somewhat schematic flow diagram showing one embodiment of a liquid delivery system in accordance with the present invention.

DETAILED DESCRIPTION OF THE INVENTION

Referring now to the drawing, a liquid delivery system is provided in which a plurality, for example, a number N, of liquid chemicals, are delivered to a plurality, for example, a number M, of individual laundry wash machines. The number of liquid chemicals to be delivered may be in the range of 2 to about 10 or more, and preferably is in the range of about 3 to about 7, for example, 5. The number of individual wash machines may be in the range of 2 to about 20 or more, and preferably is in the range of about 3 to about 15, for example, 12. The drawing has been simplified, for the sake of illustrative clarity, by reducing the number of liquid chemicals and wash machines shown.

The liquid delivery system, shown generally at 10, includes a tempered water tank 12, a tempered water valve 14, a tempered water flow switch 16, a plurality of liquid chemical valves 18, 20, and 22, a flow meter 24, an air pump 26, a plurality of diverter valves 28, 30 and 32, a water pump 34, water valves 36, 38 and 40, and a master controller, shown generally at 42.

The communication lines between the various components of system 10 and master controller 42 are shown by dashed lines in the drawing. Thus, component status information, control information and/or other information are communicated between (to and/or from) the master controller 42 and various other components of system 10 using any suitable communication technique, for example, over wires connected between the master controller and such various other components.

The tempered water tank 12 provides water to a first liquid conduit assembly, shown generally at 44. This water is provided from a water outlet 46 of tank 12 through tempered water valve 14 and tempered water flow switch 16 into first liquid conduit assembly 44. Tempered water valve 14, as shown, is a conventional solenoid valve and is controlled by master controller 42. Tempered water valve 14 can be closed to prevent water from passing from first liquid conduit assembly 44 second liquid conduit assembly 48. Tempered water flow switch 16 communicates with master controller 42 and provides information to the master controller as to the presence or absence of flow in the line in which the flow switch is located. The first liquid conduit assembly 44 provides water to each of the liquid chemical valves 18, 20 and 22. Each of the liquid chemical valves 18, 20 and 22, as shown, is a conventional solenoid valve which is controlled by master controller 42. Thus, each of the liquid chemical valves 18, 20 and 22 can be opened to allow liquid chemical to pass from individual or separate liquid chemical containers into a second liquid conduit assembly 48. Each of the liquid chemicals, for example, an alkali, an acid, a detergent, a bleach and the like, is supplied by a separate container, identified as containers 50, 52 and 54. In addition, liquid chemical flow switches 56, 58 and 60 are placed in the lines supplying liquid chemical from containers 50, 52 and 54, respectively. Each of the liquid chemical flow switches 56, 58 and 60 communicate with master controller 42 and provide information to the master controller as to the presence or absence of flow in the line in which each of these liquid chemical flow switches is located. Master controller 42 continually monitors the flow status of each of the liquid chemical flow switches 56, 58 and 60. If flow is sensed at any of these liquid chemical flow switches when the corresponding liquid chemical valve is supposed to be closed to prevent such flow, an alarm will be given, preferably at master controller 42, indicating that a liquid chemical leak is occurring and/or the corresponding liquid chemical valve is malfunctioning. This effective and rapid leak detection/valve malfunction detection is an important feature of the present invention since it reduces the costs and risks of system damage resulting from such leaks/malfunctions, and increases system effectiveness.

Flow meter 24 is a magnetic type flow meter having no moving parts and measures the volume flow of liquid passing from second liquid conduit assembly 48 into the liquid inlet 62 of air pump 26. The use of a magnetic type flow meter accurately measures the volume flow of liquid having differing viscosities with reduced recalibration requirements, for example, relative to turbine flow meters. Information as to the volume flow measured by flow meter 24 is provided to master controller 42. It is important to note that only a single flow meter is employed in system 10.

Tempered water tank 12 is supplied with water through tank fill valve 64 which, as shown, is a conventional solenoid valve and is controlled by master controller 42. Hot potable water and cold potable water are provided to a manually operated water mixing valve 66. The temperature of the water entering tank 12 is manually adjusted to meet the requirements of the particular application for which system 10 is being used. For example, the temperature of the water may be varied depending upon the liquid chemicals to be delivered by system 10 to enhance the performance of the system. To illustrate, some liquid chemicals may be somewhat difficult to completely remove from the lines. It has been found that these "difficult-to-remove" liquid chemicals are more easily removed if the water in tempered water tank 12 is hotter. Of course, it is advantageous to use cold potable water, if possible, so that the amount of energy used is reduced.

In any event, tempered water tank 12 includes a conventional liquid level monitoring assembly, shown schematically at 68, which communicates with master controller 42 (which communication line is not shown) to provide information as to the level of liquid in the tank. In response to the liquid level information provided to the master controller 42 by monitoring assembly 68, tank fill valve 64 is opened or closed to provide a proper amount of water to tempered water tank 12.

Liquid from liquid outlet 70 of air pump 26 passes into line 72 which allows flow to pass through diverter valves 28, 30 and 32. If all of the diverter valves 28, 30 and 32 are set to allow flow to pass, the liquid from air pump 26 will flow to drain 74. Ordinarily, when liquid is flowing from air pump 26 through line 72, one of the diverter valves 28, 30 and 32 is actuated to divert the liquid flow toward washers 76, 78 or 80, respectively. Diverter valves 28, 30 and 32 are actuated by air actuators (as shown, conventional solenoid valves) 82, 84 and 86, respectively. Each of the air actuators 82, 84 and 86 is controlled by master controller 42 using plant air 88.

Air pump 26 is driven by plant air 88. Air valve 90, a conventional solenoid valve, is controlled by master controller 42 so as to provide air to air pump 26, as required.

When desired, water from outlet 92 of tempered water tank 12 is pumped by pump 34 into line 94. Line 94 provides water to each of lines 96, 98 and 100. Line 96 includes water valve 36, and a pressure regulator 96. Similarly, flush line 98 includes water valve 38 and pressure regulator 104; and flush line 100 includes flush valve 40 and pressure regulator 106. Flow switches 108, 110 and 112 monitor the presence and absence of flow in lines 114, 116 and 118, respectively. Also, lines 114, 116 and 118 provide liquid to washers 76, 78 and 80, respectively. Lines 114, 116 and 118 are often several hundred feet in length.

Master controller 42 includes a pre-programmed logic controller 120, such as that sold by Allen Bradley under the tradename SLC500. Pre-programmed controller 120 includes an electronic computer or central processor which, among other functions, receives information from various components of system 10, processes such information and provides control signals to various components of the system to control the operation of the system. A keyboard or key pad 122, for example, of conventional construction, is used to input control, for example, flow time, sequence, etc., information or instructions to controller 120, which uses such information in controlling various other components of system 10. A computer monitor or other display device 124 is provided to give a visual display of the information imputed to controller 120 and/or to display the operational status of various other components of system 10 and/or to provide a visual warning of an alarm condition existing in the system. An alarm horn 126 is also coupled to controller 120 and acts to provide an audial warning of an alarm condition in system 10.

Prior to operating system 10, flow meter 24 requires calibration. This is done by passing a known volume of water from calibration tube 128 through valve 130 into second liquid conduit assembly 48, past meter 24, into and through air pump 26 and eventually out of drain 74. The number of pulses provided by flow meter 24 is correlated with the volume of water from calibration tube 128. This information is provided to master controller 42 as the basis for the calibration of flow meter 24.

The operation of system 10 is illustrated by the application in which the chemical from container 54 is to be delivered to the washer 78. It should be noted, however, that the chemical from any of the containers 50, 52 and 54, can be delivered to any of the washers 76, 78 and 80 using the present system 10.

Initially, at the start of the delivery cycle, tempered water valve 14 is opened and air pump 26 is actuated by air actuator 90. Air actuator 84 opens to allow diverter valve 30 to be positioned to divert flow into line 132. In this configuration, water from tempered water tank 12 is pumped through first liquid conduit assembly 44, through each of the liquid chemical valves 18, 20 and 22, and to second liquid conduit assembly 44. This water then flows through flow meter 24 and air pump 26 through diverter valve 28, to diverter valve 30 and into line 132 upstream of flow switch 110 for a predetermined period of time. This period of time, the length of which is controlled by master controller 42, is referred to as the "pre-flush" portion of the cycle. This length of time is sufficient to cause water to flow from line 132 into line 116 past flow switch 110. At this point, none of this water needs to be transported into washer 78.

Flow switch 110 provides information to the master controller 42 as to whether any flow at that point in the system 10 exists. If flow switch 110 senses flow then the process of pumping the chemical from container 54 can begin.

During the entire operational cycle, flow switches 56, 58 and 60 and 108, 110 and 112 are continually monitored to see if there is any flow of chemical or water. In the event that an unexpected flow is sensed, a liquid leak is indicated. If such a leak is detected, one or more alarm warnings are provided at master controller 42 so that corrective action can be taken.

With flow switch 110 sensing a flow of water, and air pump 26 still pumping water, tempered water valve 14 closes. After a predetermined time delay, for example, on the order of about 15 to about 30 seconds, liquid chemical from container 54 is allowed to flow into second liquid conduit assembly 48 by opening valve 22. As soon as valve 22 is open, flow meter 24 starts to meter all the volume of all the liquid that passes by it. As soon as the quantity or volume of liquid measured by meter 24 equals the volume of liquid chemical from container 54 that is to be delivered, valve 22 is closed. The "chemical pumping" or "injection" portion of the cycle is defined as that portion of the cycle when liquid chemical is being passed into second liquid conduit assembly 48. Master controller 42 controls the length of the "chemical pumping" portion of the cycle, based upon the amount of liquid metered by flow meter 24 after liquid chemical valve 22 is opened. The need for only a single flow meter and the very straightforward relationship used to control the length of the "chemical pumping" or "injection" portion of the cycle, are important advantages of the present invention. It should be noted that the lack of complexity of the system 10 does not adversely impact the liquid delivery performance, for example, delivery accuracy and reproducibility, of the system. Overall, the present system is more "user-friendly" and reliable than the prior art systems, for example, which require two flow meters.

After valve 22 is closed, tempered water valve 14 is opened and water from tempered water tank 12 passes into first liquid conduit assembly 44, through valves 18, 20 and 22 into second liquid conduit assembly 48, past flow meter 24, air pump 26, line 72 and into line 132 to flush out the liquid chemical valves 18, 20 and 22 for a predetermined time. This part of the cycle is identified as the "post-flush" portion. If more than one chemical was delivered during the "chemical pumping" or "injection" portion of the cycle, then system 10 cycles between "pre-flush" and "chemical pumping" portions until all the liquid chemicals have been pumped before cycling to the post-flush portion. The time of the post-flush portion of the cycle, which is controlled by master controller 42, should be sufficiently long so that all the liquid chemical or chemicals to be delivered are in line 116, which is downstream from line 132. At this point none of the liquid chemical or chemicals needs to be transported into washer 78.

After the "post-flush" portion of the cycle, the diverter valve 30 is positioned to prevent liquid from flowing with line 132 from line 72. This closes off the line 132 from the air pump 26. After the post-flush, the system 10 can process another request for chemical, for example, by another washer. Thus, even though the liquid chemical or chemicals have not yet been delivered into washer 78, the air pump 26 is available to supply other chemicals to other washers. This feature advantageously increases the amount of chemical that can be delivered by system 10 for a given period of time.

At this point, water valve 38 opens. The water pump 34 starts and pumps tempered water from outlet 92. The back pressure regulator 104 controls the water flow rate in line 98. Field start up will program in an amount of time for the water pump 34 to pass water over to washer 78, thus guaranteeing that the chemical previously delivered through diverter valve 30 into line 116 is delivered into washer 78. For example, this predetermined period of time, which is controlled by master controller 42, may be on the order of about 30 seconds to about 5 minutes or more, for example, about 1 minute, at a water flow rate of about 0.5 gallon per minute to about 10 gallons per minute, for example, about 2 gallons per minute. Water valve 38 remains open for this predetermined period of time and then closes. The status of flow switch 110 is continually monitored during this "water pumping" portion of the cycle. The presence of liquid flow in line 116 during this period of time, as positively indicated by flow switch 110, is positive proof of the delivery of the liquid chemical from container 54 to washer 78.

Air pump 26 processes only one request for liquid chemical at a time. However, multiple washers 76, 78 and/or 80 can be provided with liquid by system 10, simultaneously. Thus, the water pump 34 is on when any one or more of the water valves 36, 38 and 40 is open. An important advantage of using water pump 34 to actually deliver the liquid chemical to the washers 76, 78 and/or 80 is speed. Thus, water pump 34, which has a larger capacity than does air pump 26, very quickly passes the liquid chemical in lines 118,116 and 114 into washers 76, 78 and 80, respectively. This delivery occurs much more rapidly relative to using air pump 26 to perform this function. In addition, since air pump 26 does not perform this final delivery function, it is available to provide liquid chemical for delivery to the other washer or washers. Ultimately, the overall time for delivering liquid chemicals to the washers is advantageously reduced.

In the case of valve malfunction, a pressure relief valve is provided at the water pump 34.

During all of the above operations, the tempered water tank 12 is being filled with tempered water, as described previously and as controlled by master controller 42.

While this invention has been described with respect to various specific examples and embodiments, it is to be understood that the invention is not limited thereto and that it can be variously practiced within the scope of the following claims.

What is claimed is:

1. A liquid delivery system comprising:

a pump including a liquid inlet and a liquid outlet;

a plurality of valves, each valve located with respect to one of a plurality of containers adapted to hold liquid chemical, each of said valves adapted to control the flow of liquid chemical out of one of the containers;

a diluent valve located with respect to a diluent reservoir including a diluent outlet to control the flow of diluent out of the diluent reservoir through the diluent outlet;

a first liquid conduit assembly adapted to provide fluid communication between said diluent valve and said plurality of valves;

a second liquid conduit assembly adapted to provide fluid communication between said plurality of valves and said pump;

a total flow meter located and adapted to measure the volume flow of liquid being passed from said second liquid conduit assembly into said pump through said liquid inlet; and a control assembly adapted to control said pump, said plurality of valves and said diluent valve, and for monitoring the volume flow of liquid measured by said total flow meter, said control assembly being adapted to close said diluent valve prior to opening any of said plurality of valves to allow liquid chemical to pass into said second liquid conduit assembly, to open one of said valves to allow liquid chemical from one of the containers to pass from one of the containers into said second liquid conduit assembly, and to thereafter close said one of said valves to prevent liquid chemical from one of the containers from passing into said second liquid conduit assembly, said one of said valves being closed to prevent liquid chemical from passing from one of the containers into said second liquid conduit assembly based on the volume flow of liquid monitored by said total flow meter during the time said one of said valves is open to allow liquid chemical to pass from one of the containers into said second liquid conduit assembly.

2. The liquid delivery system of claim 1 wherein said control assembly is further adapted to open said diluent valve after said one of said valves is closed to prevent liquid chemical from passing from one of the containers into said second liquid conduit assembly.

3. The liquid delivery system of claim 2 wherein said control assembly is further adapted to open said diluent valve to allow diluent to pass into said second liquid conduit assembly for a time prior to opening any of said plurality of valves to allow liquid chemical to pass into said second liquid conduit assembly.

4. The liquid delivery system of claim 1 which further comprises a flow indicator assembly adapted to monitor diluent flow in said first liquid conduit assembly.

5. The liquid delivery system of claim 4 wherein said flow indicator assembly is a flow switch.

6. The liquid delivery system of claim 1 which further comprises a plurality of flow indicator assemblies each of which is located and adapted to monitor liquid flow between one of the containers and one of said valves.

7. The liquid delivery system of claim 6 wherein each of said plurality of flow indicator assemblies is a flow switch.

8. The liquid delivery system of claim 1 wherein said total flow meter is a magnetic flow meter.

9. The liquid delivery system of claim 1 which further comprises:

a plurality of diverter valves, each diverter valve located with respect to an individual processing unit to control the flow of liquid from said liquid outlet toward said individual processing unit;

a diluent pump including a pump inlet and a pump outlet and adapted to pump diluent out of the diluent reservoir through said pump outlet;

a plurality of line valves, each line valve located with respect to an individual processing unit to control the flow of liquid from said pump outlet into said individual processing unit; and wherein said control assembly is further adapted to control said diluent pump, said plurality of diverter valves and said plurality of line valves.

10. The liquid delivery system of claim 9 wherein said control assembly is adapted to activate one of said diverter valves to allow liquid from said liquid outlet to flow toward said individual processing unit, to deactivate said one of said diverter valves to prevent liquid from said liquid outlet from flowing toward said individual processing unit, and, thereafter to open one of said line valves to allow liquid from said pump outlet and liquid from said liquid outlet downstream of said one of said diverter valves to flow into said individual processing unit.

11. The liquid delivery system of claim 9 which further comprises a plurality of combined flow indicator assemblies each of which is located and adapted to monitor liquid flow toward a different processing unit.

12. The liquid delivery system of claim 11 wherein each of said combined flow indicator assemblies is a flow switch.

13. The liquid delivery system of claim 9 wherein each of said plurality of diverter valves includes an air driven actuator which is controlled by said control assembly.

14. The liquid delivery system of claim 1 wherein said control assembly comprises a programmable logic controller.

15. The liquid delivery system of claim 1 wherein said pump is an air driven pump.

16. A liquid delivery system for delivering liquid chemical to a plurality of processing units comprising:

a liquid pump including a liquid inlet and a liquid outlet and adapted to pump liquid chemical through said liquid outlet;

a plurality of diverter valves, each diverter valve located with respect to an individual processing unit to control the flow of liquid chemical from said liquid outlet toward said individual processing unit;

a diluent pump including a pump inlet and a pump outlet and adapted to pump diluent out of a diluent reservoir and through said pump outlet;

a plurality of line valves, each line valve located with respect to an individual processing unit to control the flow of liquid from said pump outlet into said individual processing unit;

a control assembly adapted to control said diluent pump, said plurality of diverter valves and said plurality of line valves, said control assembly being adapted to activate one of said diverter valves to allow liquid from said liquid outlet to flow toward said individual processing unit, to deactivate said one of said diverter valves to prevent liquid from said liquid outlet from flowing toward said individual processing unit, and thereafter to open one of said line valves to allow liquid from said pump outlet and liquid from said liquid outlet downstream of said one of said diverter valves to flow into said individual processing unit; and a plurality of combined flow indicator assemblies each of which is located and adapted to monitor liquid flow toward a different processing unit.

17. The liquid delivery system of claim 16 wherein each of said combined flow indicator assemblies is a flow switch.

* * * * *